United States Patent [19]

Grantham

[11] Patent Number: 4,513,348
[45] Date of Patent: Apr. 23, 1985

[54] LOW PARASITIC CAPACITANCE PRESSURE TRANSDUCER AND ETCH STOP METHOD

[75] Inventor: Daniel H. Grantham, Glastonbury, Conn.

[73] Assignee: United Technologies Corporation, Hartford, Conn.

[21] Appl. No.: 570,552

[22] Filed: Jan. 13, 1984

[51] Int. Cl.³ .............................. H01G 7/00; G01L 9/12
[52] U.S. Cl. .................................... 361/283; 29/25.41; 73/718
[58] Field of Search ............ 361/283, 434; 73/718, 73/724; 357/14, 26; 29/25.41, 25.42

[56] References Cited

U.S. PATENT DOCUMENTS

| | | | |
|---|---|---|---|
| 3,634,727 | 1/1972 | Polye | 361/434 |
| 4,405,970 | 9/1983 | Swindale et al. | 361/283 |
| 4,415,948 | 11/1983 | Grantham et al. | 361/283 |
| 4,420,790 | 12/1983 | Golke et al. | 73/718 X |
| 4,426,673 | 1/1984 | Bell et al. | 73/718 X |

Primary Examiner—Donald A. Griffin
Attorney, Agent, or Firm—M. P. Williams

[57] ABSTRACT

A capacitive pressure transducer has a pedestal 25 formed in a silicon layer 14 surrounded by a moat 26 extending through the silicon layer, with borosilicate glass 17, 22 at the edges of the silicon layer forming the walls of the pressure chamber, with a wafer 28 of silicon bonded thereto. The pedestal 25 is joined to the walls of the vacuum chamber by borosilicate glass 16, whereby it is wholly, electrically isolated therefrom. A method of forming a capacitive pressure transducer utilizing the variable etch rates of aluminum, glass and silicon, together with field assisted bonding, is also disclosed.

2 Claims, 8 Drawing Figures

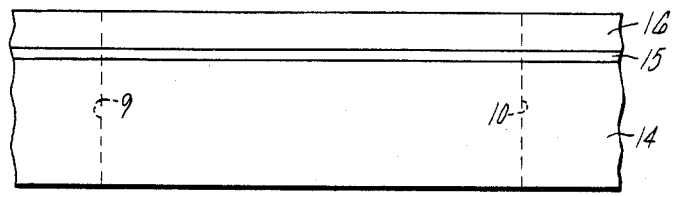
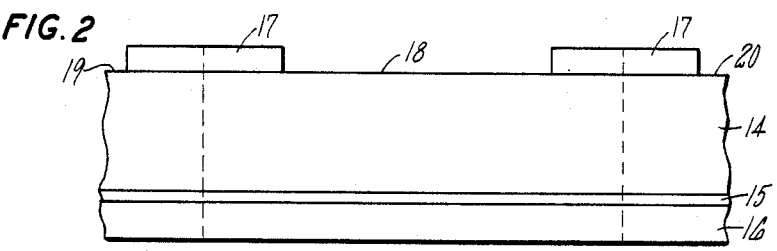
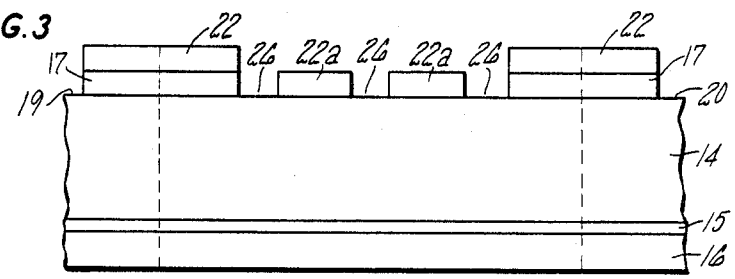
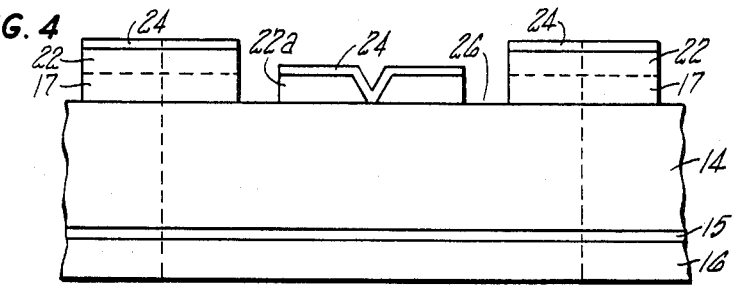

LOW PARASITIC CAPACITANCE PRESSURE TRANSDUCER AND ETCH STOP METHOD

DESCRIPTION

TECHNICAL FIELD

This invention relates to capacitive pressure transducers, and more particularly to capacitive pressure transducers having low residual (parasitic) capacitance, and capable of accurate manufacture without critical timing of etches.

BACKGROUND ART

The earliest and simplest type of a capacitive pressure transducer, in which diaphragm deflection as a function of fluid pressure causes a variation in the distance between a pair of surfaces which form the plates of a variable capacitor, is illustrated in U.S. Pat. No. 3,634,727. Therein, a capacitor is formed of two wafers of silicon insulated from each other by glass and joined together by a low temperature glass or by brazing thin metal films deposited on the glass. In U.S. Pat. No. 4,405,970, there is described capacitive pressure transducers, manufactured with microcircuit technology so as to produce a large number of transducers by processing of a pair of silicon wafers. Therein, a pair of wafers (one or both of which have been processed to provide proper materials, shaping and surfaces for the formation of pressure transducers), are joined together by field assisted vacuum bonding. In addition, the non-pressure-responsive (parasitic) capacitance is reduced by the utilization of borosilicate glass wall structures which separate the fixed portions of the two capacitors a long distance from each other, whereby the fixed capacitance is reduced. However, as described therein, there is a limit as to the extent of borosilicate glass which can be utilized with silicon due to the variation in temperature coefficient of expansion which can result in cracking, and the like, if an excessive amount of borosilicate glass is used. The use of borosilicate glass as in said '970 patent also provides the mechanism for controlling the spacing of the capacitive plates, rather than relying on the length of time of etching to control the spacing of the plates.

In U.S. Pat. No. 4,415,948, a layer of borosilicate glass is applied to one of the plates of the capacitor to avoid arcing during field assisted vacuum bonding. However, the glass, occupying space between the plates of the variable capacitor, reduces the range of relative motion between the two plates, and lowers the sensitivity of the device. A commonly owned, copending U.S. patent application entitled "Three Plate, Silicon-Glass-Silicon Capacitive Pressure Transducer", Ser. No. 527,531, filed on Aug. 29, 1983 by Grantham and Swindal and now U.S. Pat. No. 4,467,394 issued Aug. 21, 1984, discloses the use of a third conductive layer, thereby essentially providing parasitic capacitance in series, which reduces its effective capacitance to a small level.

DISCLOSURE OF INVENTION

Objects of the invention include provision of a silicon capacitive pressure transducer having very low non-pressure-responsive (parasitic) capacitance, and capacitive pressure transducers capable of manufacture utilizing noncritical etch times to provide critical dimensions thereof, and which are immune to between-plate arcing during field assisted vacuum bonding.

According to the present invention, a silicon capacitive pressure transducer includes a silicon pedestal surrounded by a moat which isolates it electrically from silicon vacuum chamber walls, the bottom wall being a silicon wafer and the top wall comprising borosilicate glass. According to the invention further, the method of forming pedestals and moats utilizes variable etch rates of aluminum, glass and silicon to provide precise dimensional control.

The present invention provides residual or non-pressure-varying capacitance only between the circular wall of the pedestal and the circular interior wall of the chamber thereof, which dimension is wholly unrelated to the dimension required for the desired pressure-varying capacitance, and which can be made substantially as large as possible to reduce the non-varying capacitance to very nearly nil. The invention also utilizes the aluminum and silicon portions of the device to provide automatic etch stops, whereby accurate dimensional control can be achieved with only approximate timing control of the etching steps, thereby facilitating the making of a large number of precision pressure transducers on large silicon wafers, utilizing production techniques which do not require accurate control. Because the pedestals are electrically isolated from the walls, no arcing results during field assisted vacuum bonding.

The foregoing and other objects, features and advantages of the present invention will become more apparent in the light of the following detailed description of an exemplary embodiment thereof, as illustrated in the accompanying drawings.

BRIEF DESCRIPTION OF DRAWINGS

FIGS. 1 through 8 are simplified, side elevation views of a portion of a pair of silicon wafers being processed in accordance with the present invention to provide a plurality of capacitive pressure transducers in accordance with the invention.

BEST MODE FOR CARRYING OUT THE INVENTION

Figure 5:
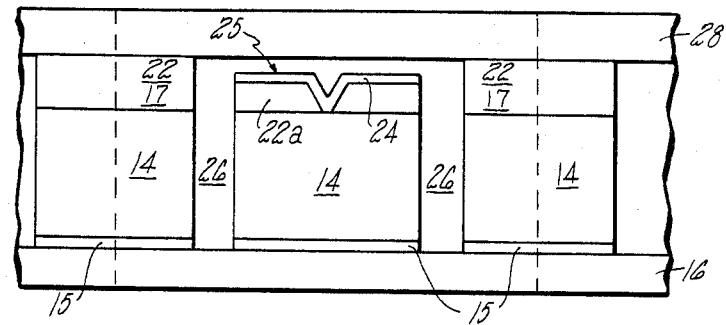

Referring to FIG. 1, the following description is of the manner of making a plurality of pressure transducers on a single pair of silicon wafers, utilizing a particular one of the transducers, between dash lines 9, 10, as an example. A large wafer 14 of doped silicon may be either N or P type having at least $10^{15}$ impurity per cc so as to achieve something under 1 ohm centimeter conductivity. Then a first layer of aluminum 15, on the order of one-half micron thick, is RF sputtered or evaporated using electron beam or resistance methodology, to coat the entire surface of the wafer 14. After that, a first layer of borosilicate glass 16 may be RF sputtered utilizing well known techniques so as to achieve a layer on the order of 25-300 microns thick across the entire surface of the aluminum 15, over the entire wafer 14. The glass 16 may, for instance, be Corning 7070 Glass, or other borosilicate glass, such as "Pyrex". Between the steps of FIG. 1 and the steps of FIG. 2, the wafer is turned over for further processing. In FIG. 2, a second layer of borosilicate glass 17 is deposited across the entire surface of the wafer 14, the thickness thereof being that which will define the spacing between the capacitor plates (about 2 microns), when all of the devices on the wafer are completed, in a manner described in more detail in the aforementioned '970 patent. Then, as seen in FIG. 2, the layer 17 is etched at each site where a capacitive pressure transducer is to be formed, three such sites 18-20 being illustrated in FIG. 2. The etching for each site may be in the form of a circle defining essentially the overall size of the interior of the pressure sensor in that dimension, although other shapes may be utilized if desired (such as squares, etc.). In FIG. 3, the entire wafer including the glass layer 17 and the exposed sites 18-20 is coated with another layer of borosilicate glass, and is then etched in the same fashion as the layer 17, but leaving annular-shaped portions 22a at the base of each of the sites, such as the site 18, the annular-shaped portions 28a of the layer 22 define that which will ultimately become the pedestal 25 (FIG. 5) upon which one of the capacitive plates is formed, and the beginning of a moat 26 surrounding the pedestal, as described hereinafter.

This thickness of the layer 22 is such as will cause the total thickness of glass layers 17, 22 to be sufficient for effective field assisted vacuum bonding, about 4 to 6 microns, typically, while allowing a lesser spacing between capacitor plates (about 2 microns). Then, the entire surface of the wafer is deposited with a layer 24 of aluminum on the order of one-half micron thick, and the aluminum is etched to expose the silicon surface of moat 26 (FIG. 4). The aluminum layer 24 provides a mask for plasma etching of silicon to extend the moat 26 through the entire wafer 14. The plasma etching may be carried out in a manner which requires protecting the other side of the wafer, and if necessary, a suitable mask layer may be provided on the surface of the glass layer 16 prior to etching. After plasma etching of the silicon to form a pedestal 25, surrounded by an annular moat 26 as illustrated in FIG. 5, the aluminum mask layer 24 is stripped off the maximal surface area that forms the interstices between the device sites and the bottoms of the moats 26, but it is protected so as to remain on the top of the pedestal 25; the layer 24 as seen in FIG. 5 comprises one plate of the pressure sensitive capacitor. Because the aluminum layer 15 is stripped at the base of the moats, each of the pedestals 25 is electrically isolated from the remainder of the related device.

After stripping off the excess aluminum, the wafer, processed in accordance with the description thus far with respect to FIGS. 1 through 5, is registered with an unprocessed silicon wafer 28 of a suitable thickness to provide strength to the composite wafers to be formed, such as on the order of 250 to 2500 microns. Then field assisted vacuum bonding, of the type described more fully in the aforementioned '970 patent, is utilized to bond the processed and unprocessed wafers together while evacuating the chamber formed by the two wafers, resulting in the configuration shown in FIG. 5. Notice that the potential for field assisted bonding is to be applied to the aluminum layer 15, at some point across the wafer, but this will not be applied to the electrically isolated pedestals, so no arcing will occur across the capacitor.

Figure 6:
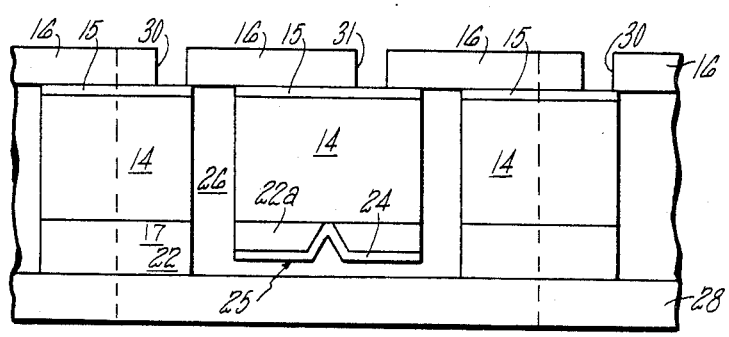
Figure 7:
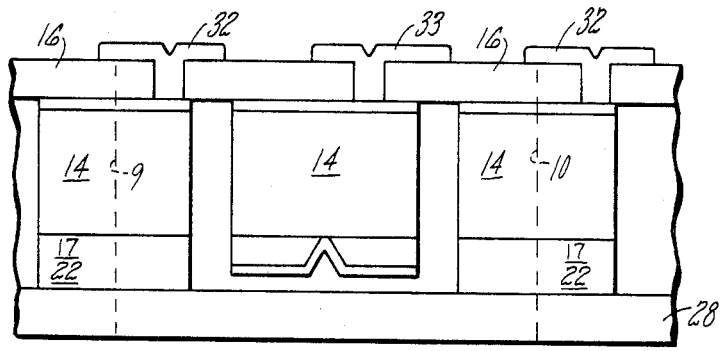

Between the steps illustrated in FIG. 5 and the steps illustrated in FIG. 6, the wafer is again turned over. In FIG. 6, the borosilicate glass layer 16 is etched, at two spots per device, so as to provide a plurality of through-holes 30, 31 for making respective contact to the two sides of the capacitive pressure transducer. Then, the entire surface of the wafer, including the borosilicate glass 16, and the exposed portions of the aluminum layers 15 beneath the through-holes 30, 31 is covered with a suitable layer of nickel or other suitable metal, such as by sputtering. The metal is then back etched to leave soldering pads 32, 33 corresponding to the through-holes 30, 31 respectively, as illustrated in FIG. 7.

Figure 8:
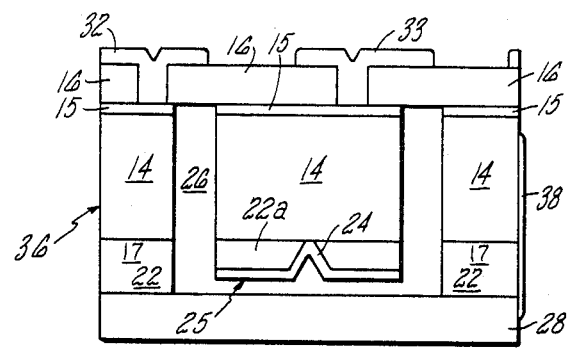

The wafer may then be sawed into dice along lines such as lines 9 and 10, and lines perpendicular thereto, to provide a plurality of individual pressure transducers such as transducer 36, as seen in FIG. 8. After dicing, a layer of nickel 38 is deposited on any one of the four side surfaces of the transducer 36 to provide conductivity between the silicon 14 wall and the silicon wafer 28 across the Pyrex layers 17, 22. In this manner, contact with the silicon layer 28 may be had from the top of the dice through the bonding pad 32, the annular outer aluminum layer 15 which is in contact therewith, the annular silicon 14, the nickel edge layer 38, to the silicon wafer 28. Contact is made with the other capacitive plate 24, through the bonding pad 33, the circular central remaining portion of the aluminum layer 15, the central pedestal portion of the silicon layer 14. Of course, if contact can be made directly to the bottom wafer 28, the layer 38 can be omitted.

What results is a capacitive pressure transducer 36, one plate of which is the aluminum layer 24 at the bottom of the central pedestal, the other plate of which is the silicon wafer 28. Because the annular moat 26 extends not only through the silicon 14 but also through the aluminum 15, there is no path to provide parasitic capacitance between the annular silicon portion 14 and the silicon wafer 28 across the Pyrex layer 17, 22. Instead, the only parasitic or residual capacitance (that which does not change with pressure) exists across the moat 26 between the annular silicon portion 14 and the silicon portion 14 of the pedestal 25. In formulating a capacitive pressure transducer on a small die, where small size is important, the plate 24 can be made very close to the plate 28 so as to have adequate capacitance with an adequate sensitivity to variations in the distance between the two plates as a function of pressure differences. However, the moat 26 can have virtually any dimension consistent with the number of dice (the number of pressure transducers) which it is desired to fabricate on a given pair of silicon wafers. The distance between the layer 24, 28 may be on the order of 2 microns; on the other hand, the distance across the moat 26 may be on the order of 350 microns. Thus, even though there are a pair of relatively large cylindrical surfaces, comprising the silicon 14, facing each other, the distance between them can be made such as to reduce the inherent, invariant capacitance to an extremely small level. This is one aspect of the capacitive pressure transducer in accordance with the present invention.

Another aspect of the present invention is that the device is so designed that its processing steps provide automatic etch stops. For instance, the etching of aluminum in the steps that transpire between FIG. 3 and FIG. 4 utilizes silicon as an etch stop. This is achieved by using a mixture of nitric and phosphoric acids as an etchant, which is capable of etching aluminum at least 1000 times faster than silicon, making it relatively easy to stop at the silicon interface without being too accurate in the timing. Similarly, etching of the silicon layer 14 so as to provide the pedestal surrounded by a moat, in the steps between FIG. 4 and FIG. 5, will utilize the aluminum layers as a mask and an etch stop (the layer 15 first extending entirely across the moat). This may be achieved by utilizing plasma etching to etch the silicon, which etches silicon at a rate which is at least 100 times faster than the rate at which it will etch aluminum. Then, the aluminum layer 15 is etched out to complete the moat 26 utilizing borosilicate glass 16 as an etch stop. Because the etching can be closely controlled, the only other care that must be taken is definition of the thicknesses of the layers of borosilicate glass 17 and 22 and the thickness of the aluminum layer 24, which defines the plate-to-plate spacing of the capacitive plates. The borosilicate glass is subject to be damaged by a wide variety of chemicals, which may pose a problem in some environments. Further if a very stiff hinge is required (layer 16), the borosilicate glass may be so thick as to create stresses as a result of the difference in temperature coefficient of expansion between the glass and the silicon. Therefore, in some applications of the invention, it may be desirable to provide only a 4–6 micron layer of glass 16 and use field assisted vacuum bonding to bond a wafer of silicon over the layer 6. The silicon may then be polished to desired thickness. Any electrical contact through such a layer would, of course, have to be provided with suitable insulation. Further, if desired in some applications, the borosilicate glass layer 16 could be provided in the form of a thick wafer, field assisted vacuum bonded to the aluminum layer 15, and polished to the desired thickness.

Although the invention has been shown and described with respect to an exemplary embodiment thereof, it should be understood that the foregoing and various other changes, omissions and additions may be made therein and thereto, without departing from the spirit and the scope of the invention.

I claim:

1. A silicon capacitive pressure transducer comprising:
    a thick layer of silicon having a moat extending therethrough thereby forming a central pedestral and the wall of a vacuum chamber with said pedestal disposed therein;
    a layer of borosilicate glass disposed on the bottom of said wall;
    a wafer of silicon bonded to said borosilicate glass forming the bottom wall of said chamber, and one of the plates of the capacitor, the other plate of the capacitor being the bottom of said pedestal;
    a thin layer of aluminum on the upper edges of said pedestal and said wall; and
    a layer of borosilicate glass disposed on said aluminum layer and across the upper end of said moat to form the top of said vacuum chamber and to form a hinge that allows the pedestal to move upwardly and downwardly with external pressure variations, thereby altering the capacitance of the capacitor, there being electrical contacts made through said upper borosilicate glass layer.

2. A method of forming a silicon capacitive pressure transducer, comprising:
    applying a first thin layer of aluminum to a first surface of a silicon wafer;
    applying a layer of borosilicate glass to said first layer of aluminum;
    applying at least one layer of borosilicate glass to a second surface of said first silicon wafer and etching away borosilicate glass to form sites for respective pressure transducers and formulate the base of pedestal portions and surrounding moats in each of said sites;
    depositing a thin layer of aluminum across the entire wafer on the side thereof where said sites are formed and etching away the aluminum to expose the silicon surface of said wafer at the bottom of said moats;
    plasma etching the silicon so as to extend said moats entirely through said first silicon wafer to the aluminum deposited on the first surface thereof;
    etching away the aluminum adjacent said first surface of said first wafer at the base of said moats;
    field assisted vacuum bonding the structure so formed to a second silicon wafer so as to provide a plurality of evacuated pressure transducers, each having a pedestal surrounded by a moat within a vacuum chamber; and providing electrical contacts through said first borosilicate glass layer to provide access to said first aluminum layer within said pedestals; and
    dicing the resulting structure to provide individual pressure transducers corresponding to each of said sites.

* * * * *